US006776737B2

United States Patent
Liu

(10) Patent No.: US 6,776,737 B2
(45) Date of Patent: Aug. 17, 2004

(54) PLANETARY DIFFERENTIAL GEAR

(76) Inventor: Yen Hsiang Liu, No. 2, Lane 12, Chung San Street, Hsichih, Taipei Hsien (TW)

( * ) Notice: Subject to any disclaimer, the term of this patent is extended or adjusted under 35 U.S.C. 154(b) by 0 days.

(21) Appl. No.: 10/407,181

(22) Filed: Apr. 7, 2003

(65) Prior Publication Data

US 2003/0195077 A1 Oct. 16, 2003

(30) Foreign Application Priority Data

Apr. 16, 2002 (TW) ........................ 91205052 U

(51) Int. Cl.[7] ............................. F16H 48/06; F16H 3/72; F16H 37/06
(52) U.S. Cl. ............................... 475/248; 475/5; 475/6
(58) Field of Search ............................. 475/220–221, 475/2, 5–6, 150, 332

(56) References Cited

U.S. PATENT DOCUMENTS

| 3,184,909 | A | * | 5/1965 | Lohf et al. | 368/220 |
| 3,656,363 | A | * | 4/1972 | Defontenay | 475/17 |
| 4,751,976 | A | * | 6/1988 | Higuchi et al. | 180/446 |
| 5,088,969 | A | * | 2/1992 | Arndt | 475/201 |
| 5,851,162 | A | * | 12/1998 | Tether | 475/150 |
| 6,098,737 | A | * | 8/2000 | Aoki | 180/242 |
| 6,461,265 | B1 | * | 10/2002 | Graham et al. | 475/5 |

FOREIGN PATENT DOCUMENTS

DE    2510623 A  *  9/1976  ............ B60K/9/00

OTHER PUBLICATIONS

US 20020096382A1*
US 20030073534A1*
US 20030232678A1*

* cited by examiner

Primary Examiner—Tisha D. Lewis
(74) Attorney, Agent, or Firm—Troxell Law Office PLLC

(57) ABSTRACT

A differential gear includes a main gear wheel rotating on an imaginary axis and having a first side and a second side opposite to the first side, a first output device, the first output device having a first sun gear pivoted to the first side of the main gear wheel for free rotation on the imaginary axis and a first output shaft extended from the first sun gear along the imaginary axis, a second output device, the second output device having a second sun gear pivoted to the second side of the main gear wheel for free rotation on the imaginary axis and a second output shaft extended from the second sun gear along the imaginary axis, and a first planet gear set, the first planet gear set having a first planet gear pivoted to the first side of the main gear wheel and meshed with the first sun gear, a second planet gear pivoted to the first side of the main gear wheel and meshed with the first planet gear, and a third planet gear pivoted to the second side of the main gear wheel and meshed with the second sun gear for synchronous rotation with the second planet gear in same direction, the number of teeth of the second planet gear being less than the first and the third planet gear.

5 Claims, 4 Drawing Sheets

PLANETARY DIFFERENTIAL GEAR

BACKGROUND OF THE INVENTION

1. Field of the Invention

The present invention relates to a differential gear and, more particularly, to a simple structure of high-performance differential gear.

2. Description of the Related Art

The transmission system of a motor vehicle is coupled between the motor and the wheels to provide a proper speed reducing ratio and a differential effect between the left and right wheels. For example, when the rear-wheel drive drives the motor vehicle to turn to the right, the revolving speed of the rear left wheel must be faster than the rear right wheel, forming a big radius of gyration and a small radius of gyration disposed in parallel to achieve the turning.

Various differential gears have been disclosed for use in motor vehicles. However, conventional differential gears are commonly comprised of a big number of gears. Due to complicated structure, conventional differential gears may fail to function easily, and much energy may be lost during friction among gears. Further, the maintenance work of conventional differential gears is also complicated.

Therefore, it is desirable to provide a differential gear that eliminates the aforesaid drawbacks.

SUMMARY OF THE INVENTION

The present invention has been accomplished under the circumstances in view. It is one object of the present invention to provide a differential gear, which uses a simple planet gear set to provide a differential effect, achieving the advantage of simple structure. It is another object of the present invention to provide a differential gear, which uses less number of parts to achieve a high transmission effect.

To achieve these and other objects of the present invention, the differential gear is to be driven by a driving device to rotate a first driven member and a second driven member, comprising: a main gear wheel to be driven by the driving gear to rotate on an imaginary axis, the main gear wheel having a first side and a second side opposite to the first side; a first output device, the first output device comprising a first sun gear pivoted to the first side of the main gear wheel for free rotation on the imaginary axis, and a first output shaft extended axially outwardly from the center of the first sun gear along the imaginary axis and adapted to rotate the first driven member; a second output device, the second output device comprising a second sun gear pivoted to the second side of the main gear wheel for free rotation on the imaginary axis, and a second output shaft extended axially outwardly from the center of the second sun gear along the imaginary axis and adapted to rotate the second driven member; and a first planet gear set, the first planet gear set comprising a first planet gear pivoted to the first side of the main gear wheel and meshed with the first sun gear, a second planet gear pivoted to the first side of the main gear wheel and meshed with the first planet gear, and a third planet gear pivoted to the second side of the main gear wheel and meshed with the second sun gear for synchronous rotation with the second planet gear in direction same as the second planet gear, the number of teeth of the second planet gear being less than the first and the third planet gear.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
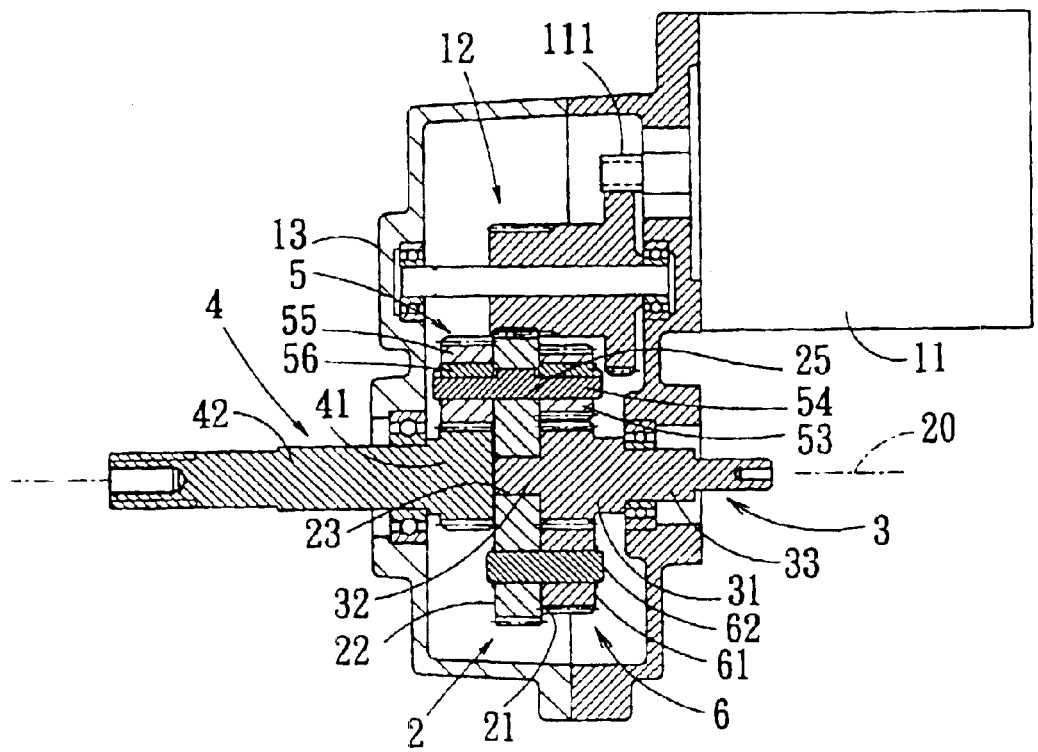
FIG. 1 is a sectional front view showing a differential gear installed in the gear box of a motor vehicle according to the present invention.
Figure 2:
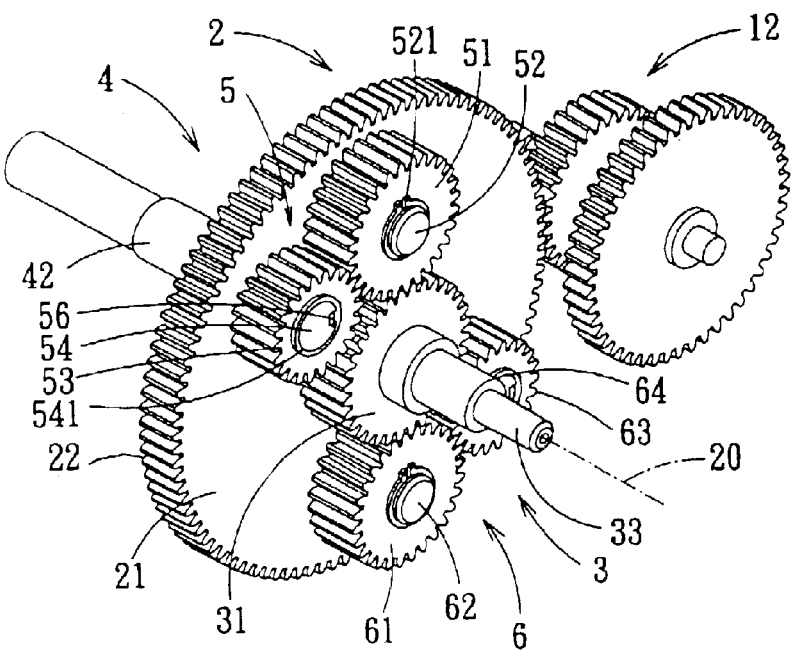
FIG. 2 is an oblique right side view in elevation of the present invention, showing the differential gear coupled to a driving gear set.
Figure 3:
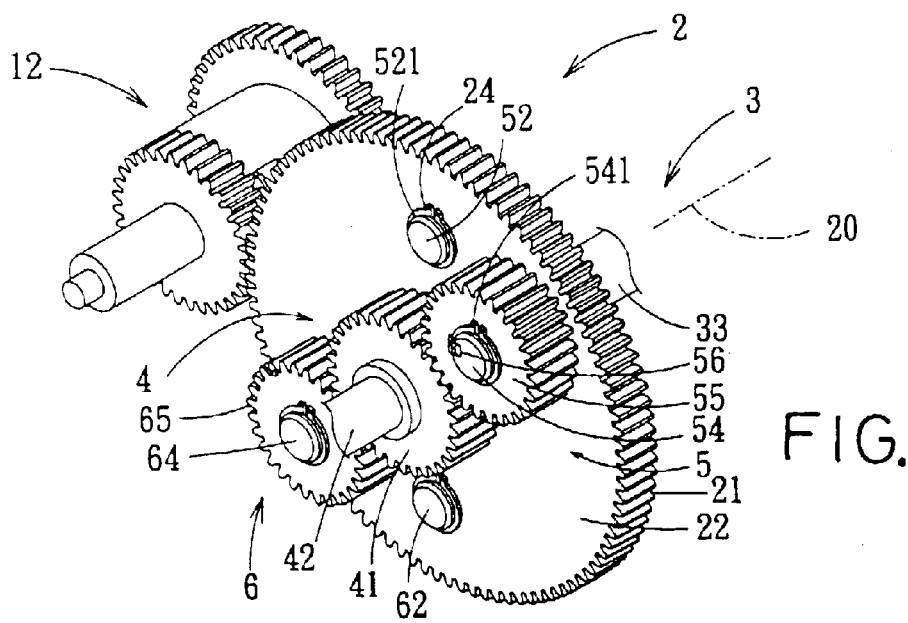
FIG. 3 is an oblique left side view in elevation of the present invention.

Referring to FIGS. 1–3, a differential gear is shown installed in a rear-wheel-drive motor vehicle (not shown) and adapted to be driven by a motor 11 of the motor vehicle to rotate one rear right wheel (not shown) and one rear left wheel (not shown), so as to further move the motor vehicle. The differential gear provides a differential effect to the rear right wheel and the rear left wheel when desired. The differential gear may also be used in any of a variety of transportation vehicles, machine tools, or mechanical apparatus that comprise a drive equivalent to the motor 11, a first driven member equivalent to the aforesaid rear right wheel, and a second driven member equivalent to the aforesaid rear left wheel.

The differential gear comprises a main gear wheel 2, a first output device 3, a second output device 4, a first planet gear set 5, and a second planet gear set 6. The differential gear is mounted with a driving gear set 12 inside a dust-protective gear box 13 (see FIG. 1). The driving gear set 12 is meshed with the output shaft 111 of the aforesaid motor 11 (alternatively, any of a variety of suitable transmission mechanisms may be used and coupled between the output shaft 111 of the motor 11 and the driving gear set 12).

The main gear wheel 2 is meshed with the driving gear 12, and driven by the driving gear 12 to rotate on an imaginary axis 20. The main gear wheel 2 has a first side 21 and a second side 22 opposite to the first side 21.

The first output device 3 is comprised of a first sun gear 31, a first axle 32, and a first output shaft 33. The first sun gear 31 is located on the first side 21 of the main gear wheel 2. The first axle 32 is extended axially from the wheel center of the first sun gear 31 toward the outer (left) side, and inserted through an axle hole 23 in the wheel center of the main gear wheel 2 for free rotation relative to the main gear wheel 2. Therefore, the first output device 3 can be rotated on the imaginary axis 20, and the first axle 32 supports rotation of the main gear wheel 2. The first output shaft 33 is extended axially from the wheel center of the first sun gear 31 toward the outer (right) side, and coupled to the rear right wheel of the aforesaid motor vehicle through a coupling device (not shown).

The second output device 4 is comprised of a second sun gear 41 and a second output shaft 42. The second sun gear 41 is provided at the center of the second side 22 of the main gear wheel 2 for free rotation on the aforesaid imaginary axis 20. The second output shaft 42 is extended axially from the center of the second sun gear 41 toward the outer (left) side, and coupled to the rear left wheel of the aforesaid motor vehicle through a coupling device (not shown).

The first planet gear set 5 is comprised of a first planet gear 51, a first pivot shaft 52, a second planet gear 53, a second pivot shaft 54, a third planet gear 55, and a key 56. The first planet gear 51 is provided at the first side 21 of the main gear wheel 2 and mounted on the outer (right) end of the first pivot shaft 52. The inner (left) end of the first pivot shaft 52 is inserted through a through hole 24 in the main gear wheel 2, keeping the first planet gear 51 meshed with the first sun gear 31 for free rotation on its own axis (pivot shaft 52) and for synchronous movement with the main gear wheel 2 around the imaginary axis. Two retaining rings 521 are respectively fastened to the outer (right) and inner (let) ends of the first pivot shaft 52, preventing falling of the first pivot shaft 52 from the first planet gear 51 or the main gear wheel 2.

The second pivot shaft 54 is inserted through a second through hole 25 of the main gear wheel 2. The second planet gear 53 and the third planet gear 55 are respectively mounted on the right and left ends of the second pivot shaft 54 and disposed at the first side 21 and second side 22 of the main gear wheel 2. Two keys 56 connect the second planet gear 53 and the third planet gear 55 to the second pivot shaft 54 respectively to constrain the second planet gear 53 and the third planet gear 55 to rotate synchronously in the same direction. The second planet gear 53 is meshed with the first planet gear 51 but not in engagement with the first sun gear 31. The third planet gear 55 is meshed with the second sun gear 41. Two retaining rings 541 are respectively fastened to the two ends of the second pivot shaft 54, preventing falling of the second pivot shaft 54 from the second planet gear 53 and the third planet gear 55. According to this embodiment, the first planet gear 51 and the third planet gear 55 are identical. The number of teeth of the second planet gear 53 is less than the first planet gear 51 and the third planet gear 55.

The second planet gear set 6 is symmetrical to the first planet gear set, comprised of a fourth planet gear 61, a third pivot shaft 62, a fifth planet gear 63, a fourth pivot shaft 64, and a sixth planet gear 65. The fourth planet gear 61 is pivotally fastened to the first side 21 of the main gear wheel 2 by the third pivot shaft 62. The third pivot shaft 62 and the first pivot shaft 52 are symmetrically disposed at two sides relative to the first sun gear 31. The fifth planet gear 63 and the sixth planet gear 65 are respectively pivoted to the first side 21 and second side 22 of the main gear wheel 2 by the fourth pivot shaft 64 for synchronously rotation. The fourth pivot shaft 64 and the second pivot shaft 54 are symmetrically disposed at two sides relative to the first sun gear 31. The number of teeth of the fifth planet gear 63 is equal to the second planet gear 53. The number of teeth of the fourth and sixth gears 61 and 65 is equal to the first and third planet gears 51 and 55.

Before starting the motor 11, the left and right wheels of the motor vehicle are immovable, and the static friction between the wheels of the motor vehicle and the ground imparts a resistance to the first sun gear 31 and the second sun gear 41 to stop the first and second sun gears 31 and 41 from rotation. When the motor 11 started to rotate the main gear wheel 2, the first pivot shaft 52 and the second pivot shaft 54 are forced to move the first planet gear 51 and the third planet gear 55 with the main gear wheel 2. Thereby, the first sun gear 31 and the second sun gear 41 are rotated in the direction same as the main gear wheel 2.

Figure 4:
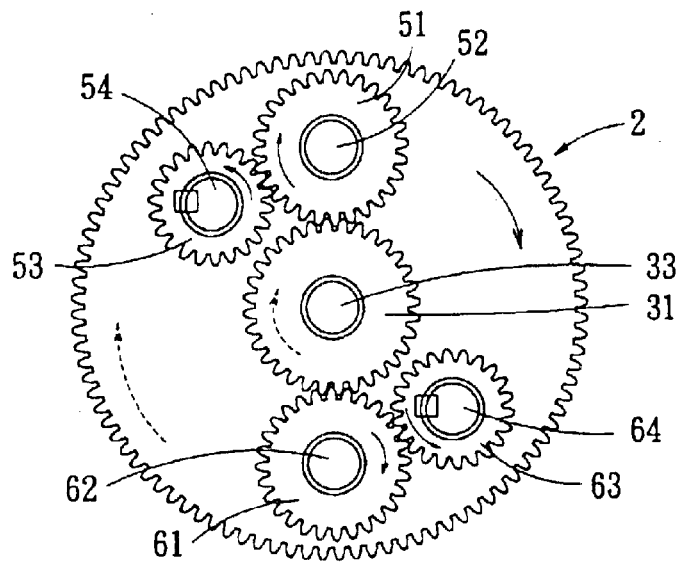
FIG. 4 is a schematic right side view of the present invention showing an operation status of the differential gear after start of the motor during normal movement of the motor vehicle.
Figure 5:
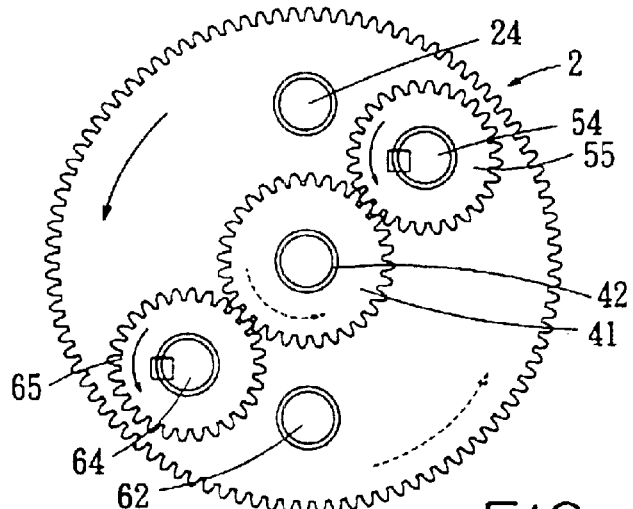
FIG. 5 is a schematic view of the opposite side of FIG. 4.

If the torque of the motor 11 is lower than the wheel resistance that the first sun gear 31 and the second sun gear 41 cannot be rotated, the first planet gear 51 and the third planet gear 55 tend to rotate on the first pivot shaft 52 and the second pivot shaft 54 respectively in the direction same as the main gear wheel 2 (see the arrow shown in FIGS. 4 and 5). But the second planet gear 53 and the third planet gear 55 must be rotated synchronously in the same direction, and the second planet gear 53 and the first planet gear 51 are meshed together and prohibited from a rotation in the same direction, so that the first, second, and third planet gears 51, 53, and 55 and the main gear wheel 2 are stopped from rotation at this time. Once the torque of motor 11 overcome the wheel resistance, the main gear wheel 2 rotated by the torque of the motor 11 on axle 32, and also the first planet gear 51 and, the third planet gear 55 are rotated on axle 32, thereby causing the first sun gear 31, and the second sun gear 41 to be rotated in the direction same as the main gear wheel 2, and therefore the rear right and left wheels of the motor vehicle are rotated (see the imaginary arrow shown in FIGS. 4 and 5).

Figure 6:
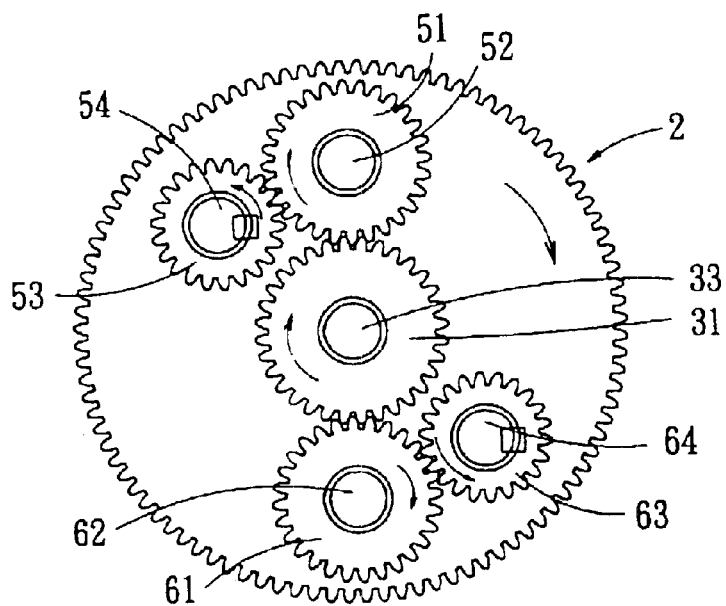
FIG. 6 is a schematic right side view of the present invention showing an operation status of the differential gear when the motor vehicle turned to the right.
Figure 7:
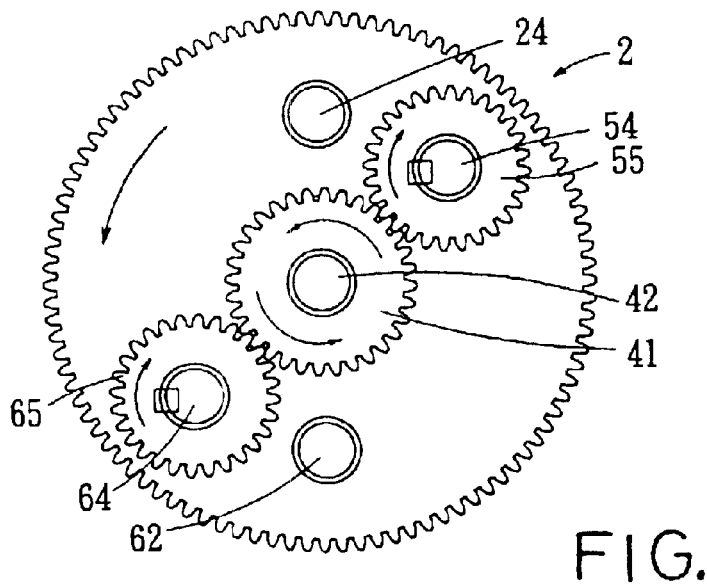
FIG. 7 is a schematic view of the opposite side of FIG. 6.

When the motor vehicle turned toward the right, the friction between the rear right wheel and the ground is increased, and the first sun gear 31 is decelerated, and at this time, as shown in FIGS. 6 and 7, the first planet gear 51 is rotated on pivot shaft 52 in the direction same as the main gear wheel 2, thereby causing the second planet gear 53 to rotate on pivot shaft 54 in the direction reversed to the first planet gear 51, and therefore the third planet gear 55 and the second planet gear 53 are synchronously rotated on pivot shaft 54 in the same direction. At this time, the third planet gear 55 drives the second sun gear 41 to rotate in the direction same as the main gear wheel 2. The rotating of the third planet gear 55 on pivot shaft 54 accelerates the rotation of the second sun gear 41, thereby causing the rear left wheel of the motor vehicle to be rotated at a speed relatively higher than the rear right wheel, and therefore the motor vehicle is turned to the right.

A prototype of differential gear has been constructed with the features of FIGS. 1–7. The differential gear functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A differential gear to be driven by a driving device to rotate a first driven member and a second driven member, the differential gear comprising:

a main gear wheel to be driven by said driving device to rotate on an imaginary axis, said main gear wheel having a first side and a second side opposite to said first side;

a first output device, said first output device comprising a first sun gear pivoted to the first side of said main gear wheel for free rotation on said imaginary axis, and a first output shaft extended axially outwardly from the center of said first sun gear along said imaginary axis and adapted to rotate said first driven member;

a second output device, said second output device comprising a second sun gear pivoted to the second side of said main gear wheel for free rotation on said imaginary axis, and a second output shaft extended axially outwardly from the center of said second sun gear along said imaginary axis and adapted to rotate said second driven member; and a first planet gear set, said first planet gear set comprising a first planet gear pivoted to the first side of said main gear wheel and meshed with said first sun gear, a second planet gear pivoted to the first side of said main gear wheel and meshed with said first planet gear, and a third planet gear pivoted to the second side of said main gear wheel and meshed with said second sun gear for synchronous rotation with said second planet gear in direction same as said second planet gear, the number of teeth of said second planet gear being less than said first and third planet gear.

2. The differential gear as claimed in claim 1, wherein said main gear wheel has an axle hole through which said imaginary axis passes; said first output device further comprises a first axle extended axially from the center of said first sun gear and inserted through said axle hole of said main gear wheel for free rotation in said axle hole of said main gear wheel.

3. The differential gear as claimed in claim 1, wherein said main gear wheel further comprises a first through hole adjacent to said first planet gear; said first planet gear set further comprises a first pivot shaft pivotally inserted through said first through hole of said main gear wheel; said first planet gear is fastened pivotally with said pivot shaft and meshed with said first sun gear.

4. The differential gear as claimed in claim 1, wherein said main gear wheel further comprises a second through hole adjacent to said second planet gear; said first planet gear set further comprises a second pivot shaft, which pivots said second planet gear and said third planet gear to said second through hole of said main gear wheel, and two keys connect said second planet gear and said third planet gear to said second pivot shaft respectively to constrain said second planet gear and said third planet gear to rotate synchronously in same direction.

5. The differential gear as claimed in claim 4 further comprising a second planet gear set, said second planet gear set comprising a fourth planet gear pivoted to the first side of said main gear wheel and meshed with said first sun gear, a fifth planet gear pivoted to the first side of said main gear wheel and meshed with said fourth planet gear, and a sixth planet gear pivoted to the second side of said main gear wheel and meshed with said second sun gear for synchronous rotation with said fifth planet gear in same direction, the number of teeth of said fifth planet gear being less than said fourth planet gear and said sixth planet gear.

* * * * *